(12) United States Patent
Borke et al.

(10) Patent No.: US 10,854,015 B2
(45) Date of Patent: Dec. 1, 2020

(54) REAL-TIME QUALITY CONTROL DURING MANUFACTURING USING AUGMENTED REALITY

(71) Applicant: VENTANA 3D, LLC, Van Nuys, CA (US)

(72) Inventors: Michael James Borke, Santa Clara, CA (US); Hayk Bezirganyan, Burbank, CA (US); Ashley Crowder, Culver City, CA (US); Benjamin Conway, Anaheim Hills, CA (US)

(73) Assignee: VENTANA 3D, LLC, Santa Clara, CA (US)

(*) Notice: Subject to any disclaimer, the term of this patent is extended or adjusted under 35 U.S.C. 154(b) by 0 days.

(21) Appl. No.: 16/297,639

(22) Filed: Mar. 9, 2019

(65) Prior Publication Data
US 2019/0279433 A1    Sep. 12, 2019

Related U.S. Application Data

(60) Provisional application No. 62/640,877, filed on Mar. 9, 2018.

(51) Int. Cl.
*G06T 19/20* (2011.01)
*G06T 7/00* (2017.01)
*G06T 7/30* (2017.01)

(52) U.S. Cl.
CPC .............. *G06T 19/20* (2013.01); *G06T 7/001* (2013.01); *G06T 7/30* (2017.01); *G06T 2219/2004* (2013.01); *G06T 2219/2012* (2013.01)

(58) Field of Classification Search
CPC combination set(s) only.
See application file for complete search history.

(56) References Cited

U.S. PATENT DOCUMENTS

| | | | |
|---|---|---|---|
| 8,730,309 B2 | 5/2014 | Wilson et al. | |
| 9,547,222 B2 | 1/2017 | Smith et al. | |
| 2010/0158355 A1* | 6/2010 | Najafi | G06K 9/3208 382/154 |
| 2012/0008829 A1* | 1/2012 | Hao | G03B 17/54 382/103 |
| 2014/0184749 A1* | 7/2014 | Hilliges | G01S 17/89 348/47 |
| 2015/0350617 A1 | 12/2015 | Chevassus et al. | |

OTHER PUBLICATIONS

International Search Report dated Jun. 6, 2019 in connection with PCT/US2019/021505.

* cited by examiner

*Primary Examiner* — Tapas Mazumder
(74) *Attorney, Agent, or Firm* — Behmke Innovation Group LLC; James M. Behmke; Jonathon P. Western

(57) ABSTRACT

Various techniques are described herein that provide for real-time quality control during manufacturing using augmented reality. In particular, in one embodiment, techniques herein project a three-dimensional (3D) virtual shape/model onto a work-in-progress part in the real-world in order to see defects in real-time, thus allowing for mid-manufacturing corrections. The embodiments herein generally consist of first calibrating a "virtual world" to the real world, then calibrating the physical product to the virtual world, and lastly projecting information onto the physical product, such as various design information and/or quality control information.

20 Claims, 8 Drawing Sheets

REAL-TIME QUALITY CONTROL DURING MANUFACTURING USING AUGMENTED REALITY

RELATED APPLICATION

This application claims priority to U.S. Provisional Patent Application No. 62/640,877, filed Mar. 9, 2018, entitled REAL-TIME QUALITY CONTROL DURING MANUFACTURING USING AUGMENTED REALITY, by Borke et al., the contents of which are hereby incorporated by reference in their entirety.

TECHNICAL FIELD

The present disclosure relates generally to augmented reality, and, more particularly, to real-time quality control during manufacturing using augmented reality.

BACKGROUND

Quality control (QC) is a process by which entities review the quality of certain (e.g., all) factors involved in production. Generally, although quality can be based on "softer" elements (e.g., job management, performance, competence, integrity, and so on), inspection is a major component of quality control, where a physical product is examined visually. As such, product inspectors are often provided with lists and descriptions of unacceptable product defects such as cracks or surface blemishes for example. Early forms of quality control, for example, were drawings of a desired item, where if the item didn't match the drawing, the item was rejected. However, more sophisticated manufactured products made it difficult to make parts exactly like their depiction, leading to the introduction of tolerance limits, where it was understood that a product would function adequately so long as its parts were measured to be within the limits. Based on this understanding, the "quality" of many manufactured products could then be determined using devices such as plug gauges and ring gauges.

However, as manufacturing processes become more complex, magnitudes larger, and often with lower tolerance limits, the conventional methods of performing quality control are inefficient. For instance, traditional quality control techniques often miss detection of a defect until after the product is already completely manufactured, resulting in wasted time and materials.

SUMMARY

According to embodiments herein, various techniques provide for real-time quality control during manufacturing using augmented reality. In particular, in one embodiment, techniques herein project a three-dimensional (3D) virtual shape/model onto a work-in-progress part in the real-world in order to see defects in real-time, thus allowing for mid-manufacturing corrections. The embodiments herein generally consist of first calibrating a "virtual world" to the real world, then calibrating the physical product to the virtual world, and lastly projecting information onto the physical product, such as various design information and/or quality control information.

Specifically, in one particular embodiment herein, the techniques herein calibrate a virtual world to a real world, the real world having one or more projectors and one or more sensors, calibrate a physical object in the real world to a virtual object in the virtual world based on the one or more sensors, compare the physical object to the virtual object based on the one or more sensors, determine information about the physical object based on the comparing, and project the information about the physical object onto the physical object using the one or more projectors.

Other specific embodiments, extensions, or implementation details are also described below.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

As noted above, quality control for complex manufacturing processes can be difficult and/or generally inefficient. For instance, for additive manufacturing, such as 3D printing or manual application of layers of material (e.g., fiberglass, carbon fiber, or other composite materials), the manufacturing process could take days or even weeks. If at the end of the manufacturing process it is determined that the product was improperly made, such as taking on the wrong shape, having too much or too little material in certain or all areas, etc., then the finished product must either be corrected or completely discarded. Correcting the defects, if even possible, may be wasteful if excess material needs to be removed (e.g., trimmed off to match the desire depth/size/shape/etc.), both in terms of wasted material and time, and also if adding additional materials, where incurred costs may include requiring bonding agents, pre-treatment, and so on. Furthermore, when trimming off excess material, the correction must also ensure that the removal of too much material does not occur.

According to the embodiments herein therefore, techniques are provided for projecting a three-dimensional (3D) virtual shape/model (e.g., a computer-aided design or "CAD" file) onto a work-in-progress part in the real-world in order to see defects in real-time, thus allowing for mid-manufacturing corrections. As described below, the embodiments herein generally consist of first calibrating a "virtual world" to the real world, then calibrating the physical product to the virtual world, and lastly projecting information onto the physical product, such as various design information and/or quality control information.

Figure 1A:
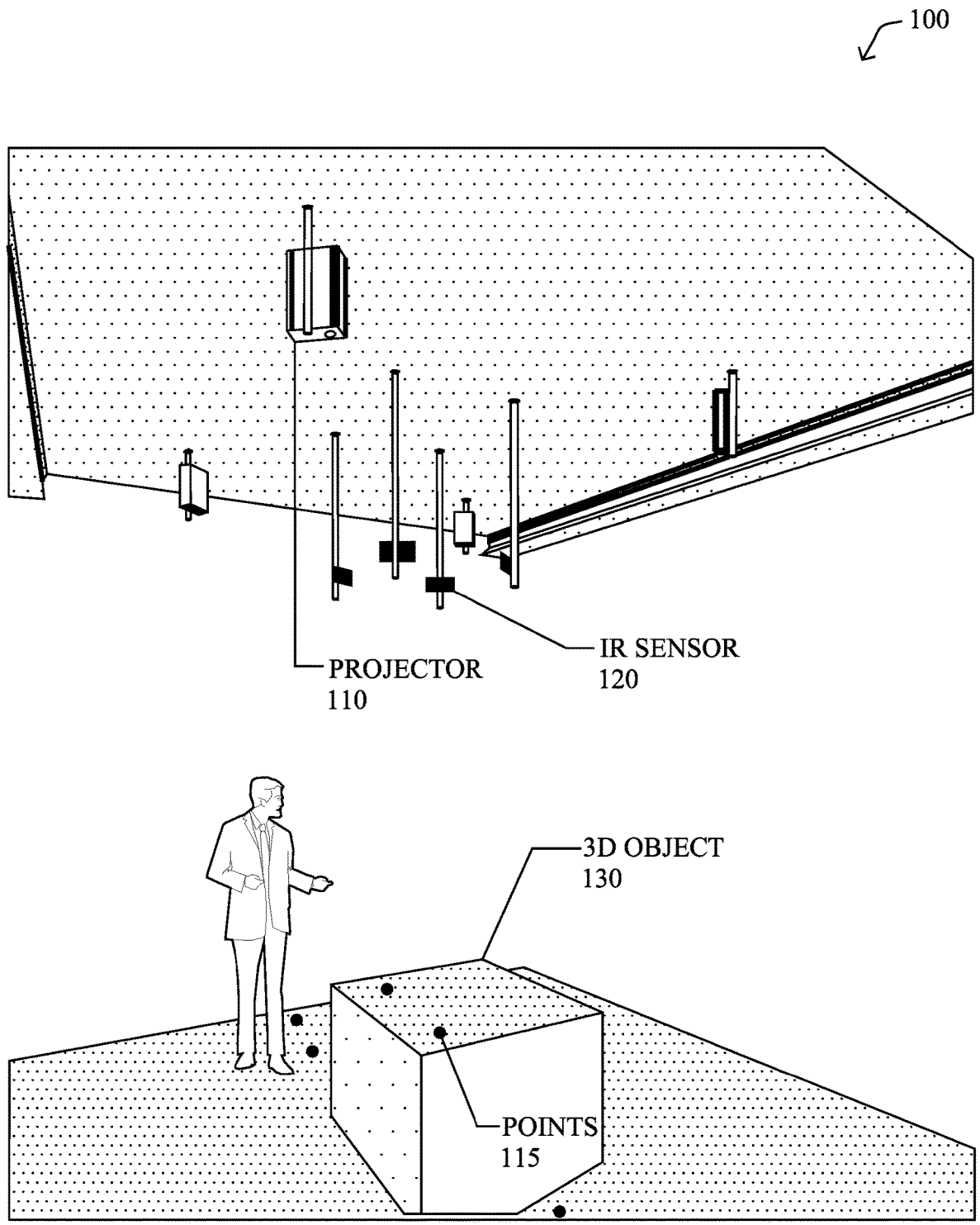
FIGS. 1A-1B illustrate an example of calibration for real-time quality control during manufacturing using augmented reality.
Figure 1B:
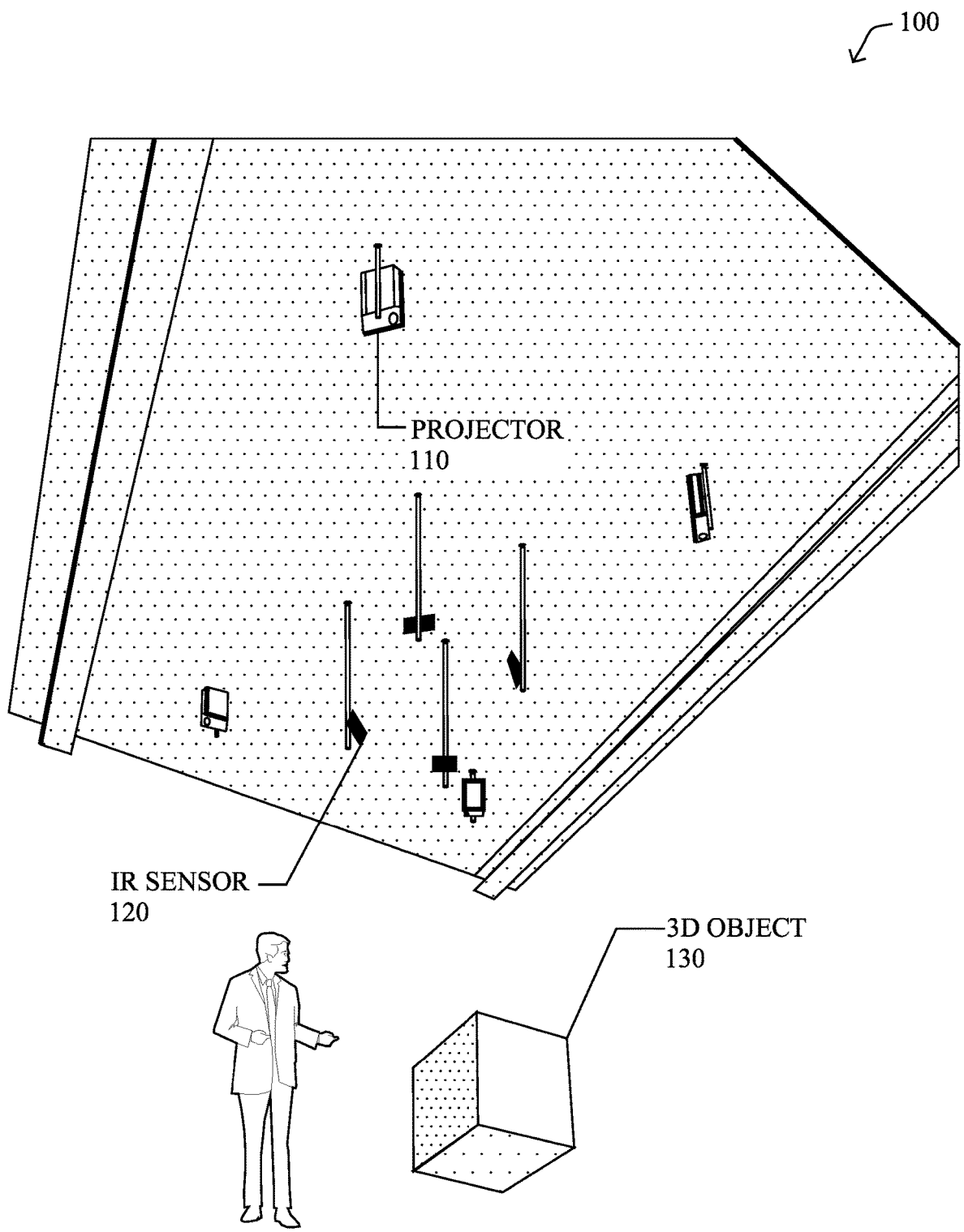

Operationally, the present disclosure first provides a calibration technique to map a virtual simulated space to real world space. For instance, with reference generally to the system 100 of FIGS. 1A-1B, one or more projectors 110 may be set up to project on a given area (e.g., a clean room, manufacturing floor, or otherwise). Also, one or more sensors 120, such as illustrative infrared (IR) cameras (or lasers, lidar, cameras, and so on), may be placed into known positions (e.g., locked/stationary or else with positions that may be determined, such as through "inside-out tracking", which will be understood by those skilled in the art), and arranged to view some portion of the projection area. (Note that the sensors may generally be "locked" relative to the projector(s) during the calibration in order to determine the sensor position relative to the projector. However, by using techniques for tracking the position of the sensor at all times (relative to the projector), then the sensor positions may be moveable, accordingly.)

According to the techniques herein, at least one projector then projects colored points 115 at known projector-relative landmarks, such as, for example, five equally spaced points, top to bottom, on the centerline of the projection. A reference object 130, such as a square block, may also be set under the projection such that one of the colored projection points aligns with a particular location of the object 130, such as the center of the top of the block. Using Blob Detection (an image processing technique that, given a set of parameters, defines "blobs" or grouped sets of pixels in an image, as will be appreciated by those skilled in the art), the sensors 120 detect the block and store both its virtual reference point (e.g., the center point), relative to the sensor, and the colored point positions, relative to the projector, as an anchor point. This is repeated a plurality of times (e.g., four times—twice on two different colored projection points) to achieve multiple (e.g., four) anchor points.

Generally, a minimum of four anchor points should be measured. For example, these four points are used to draw two lines; one connecting each pair of virtual points that share a colored point. The intersection of the resulting lines will yield the virtual position of the projector, relative to the sensor. Using these lines, virtual boundary values (top, bottom, left, right, near, and far planes) of the real-world projection area are calculated and used to create a perspective projection transform matrix using the following formula:

$$\begin{pmatrix} \frac{2n}{r-l} & 0 & \frac{r+l}{r-l} & 0 \\ 0 & \frac{2n}{t-b} & \frac{t+b}{t-b} & 0 \\ 0 & 0 & \frac{-(f+n)}{f-n} & \frac{-2fn}{f-n} \\ 0 & 0 & -1 & 0 \end{pmatrix}. \quad \text{Eq. 1}$$

Here, assuming a coordinate system relative to the projector's virtual position and rotation, n corresponds to the projection volume's "near" bounding plane, f corresponds to the projection volume's "far" bounding plane, l corresponds to the projection volume's left bounding plane, r corresponds to the projection volume's right bounding plane, t corresponds to the projection volume's top bounding plane, and b corresponds to the projection volume's bottom bounding plane.

Second, an orientation technique is defined herein to match up a 3D virtual object (e.g., a CAD file) to a real-world object that is of an unknown orientation, scale/size, and position. (For example, in addition to rotational orientation, an object may be located on its side, while the corresponding CAD file is in an upright position.) An illustrative orientation technique is as follows, with reference generally to example 200 of FIGS. 2A-2B, with a virtual object 210, and a physical object 220:

1. Put three dots (real markers 225) on the real-world object 220.
2. On the 3D virtual object, place virtual markers 215 that perfectly match the positions of the real-world dots 225 (take a cursor in virtual world and mark the same points on the CAD file that are marked on the real world object, e.g., easily identifiable features such as corners or actual markers).
3. Measure heights of the real world dots 225 from the ground (i.e., if a dot is on the floor its height is 0). These are the Y-axis values for each of the three dots.
4. Because of the real world to virtual conversion from above, the system herein now has the virtual heights of these three points. With these virtual heights, the techniques herein can then determine the pitch and roll of the virtual model/object 210 (e.g., CAD model) that matches the real object 220.
5. As shown in FIG. 2B, the software may then project a crosshair 230 onto the real-world object 220. Users (or robots) may then drag and match the crosshair projection to match with dot/markers "1" and "2" of the real-world object, thus providing X and Z virtual point values.
6. The virtual x, y, and z of two real-world markers, and the virtual y of the third marker, can thus be known. With this, the techniques herein can determine the Yaw. (For example, by drawing a line between the first two CAD model markers, and another line between the "Point Cloud" points just calculated, the difference in angle between these two lines is the yaw rotation, as shown in FIG. 2B (e.g., based on angles a, b, c, and d, as will be understood by those skilled in the art).)
7. Now, the system herein calculates the distance between the two CAD points (virtual markers 215) and the two Point Cloud points (real markers 225). If the two distances are not the same, the CAD file is scaled to match the Point Cloud.
8. Last, the system herein takes the position of marker 1 of the Point Cloud and transform the CAD such that both marker 1's match. The CAD, Point Cloud, and real-world object are now matched—i.e., they have the same orientation, scale, and position.

Figure 2A:
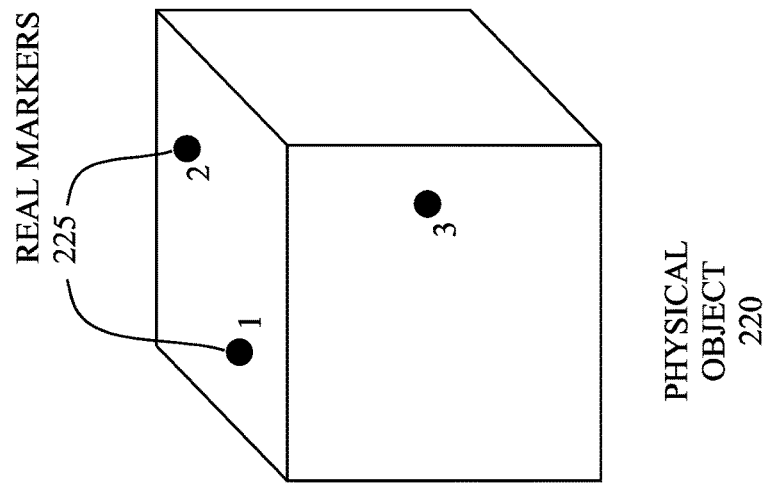
FIGS. 2A-2C illustrate another example of calibration for real-time quality control during manufacturing using augmented reality.
Figure 2A:
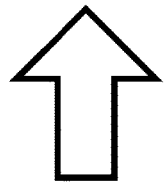
Figure 2A:
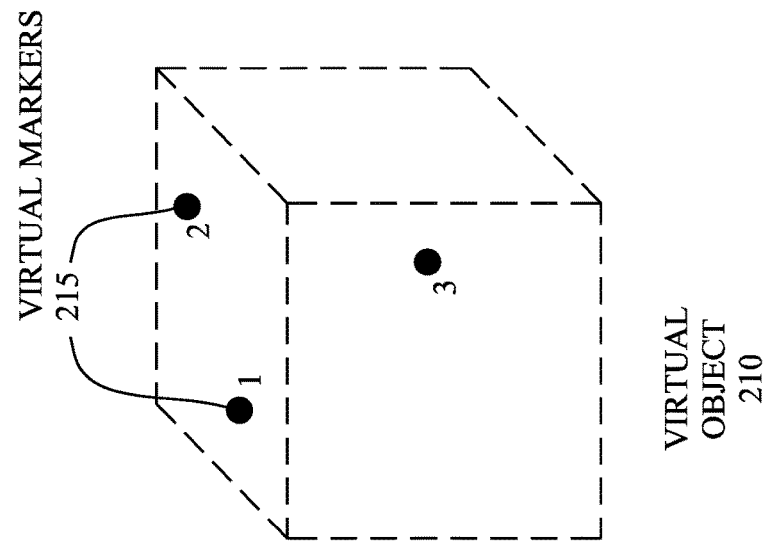
Figure 2B:
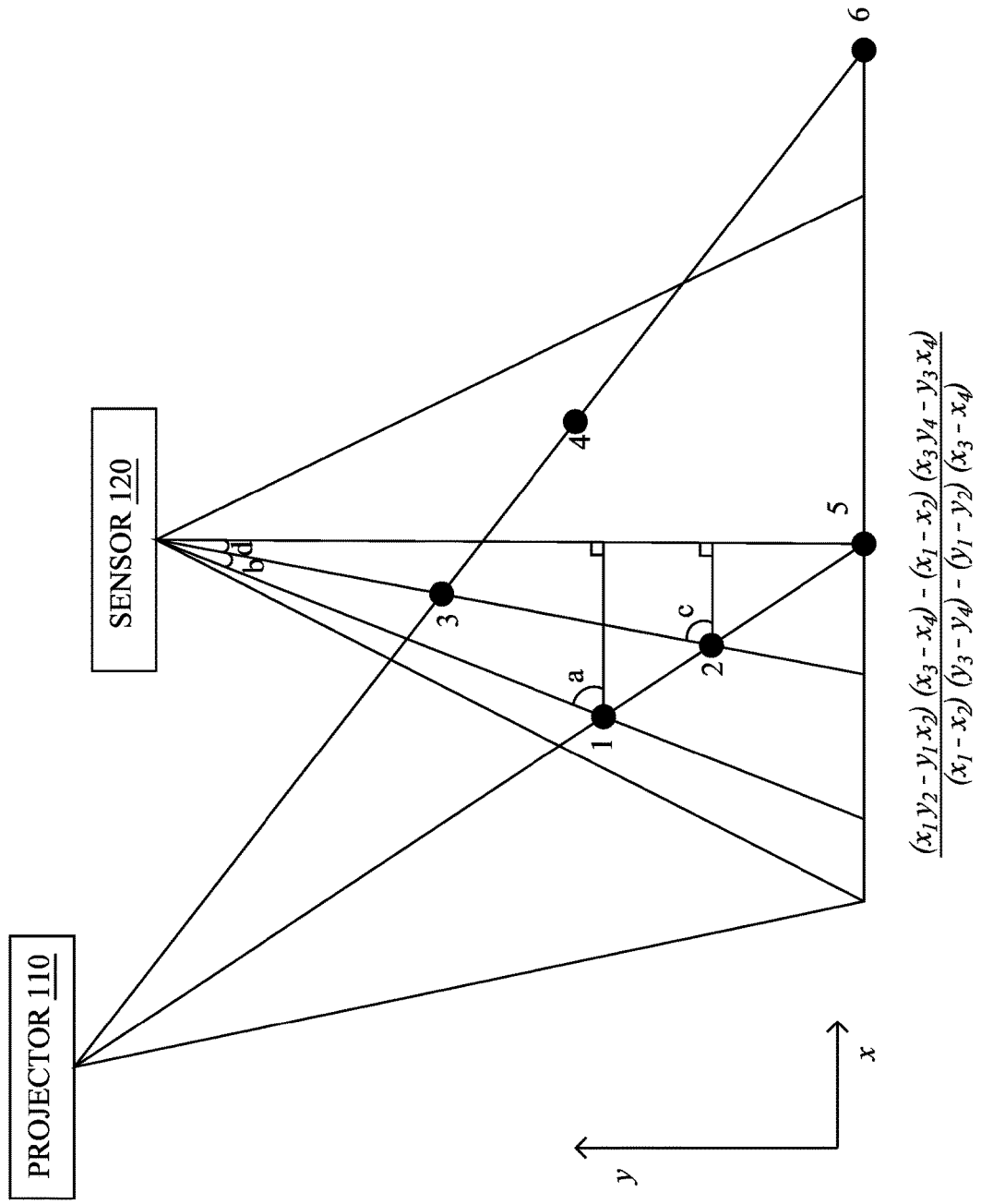
Figure 2C:
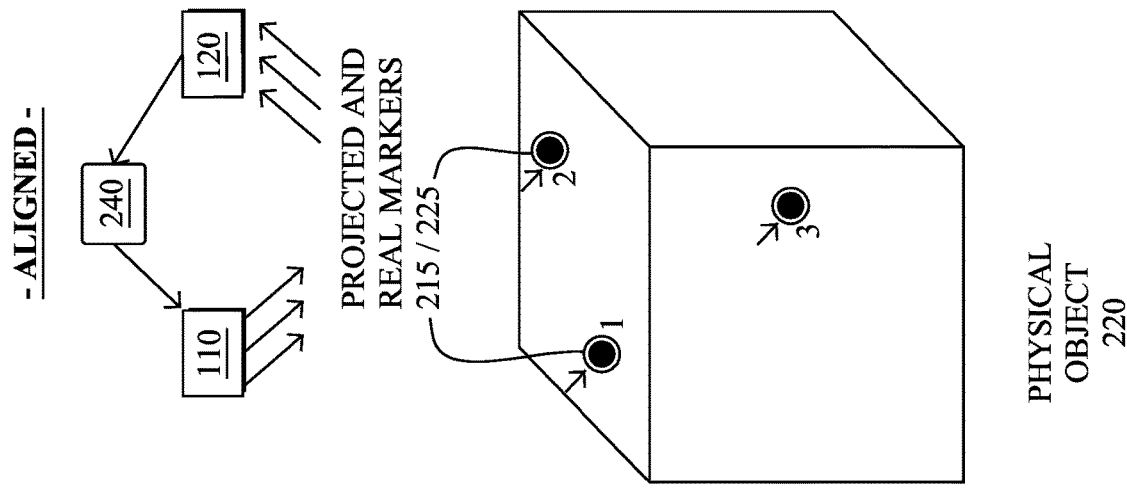
Figure 2C:
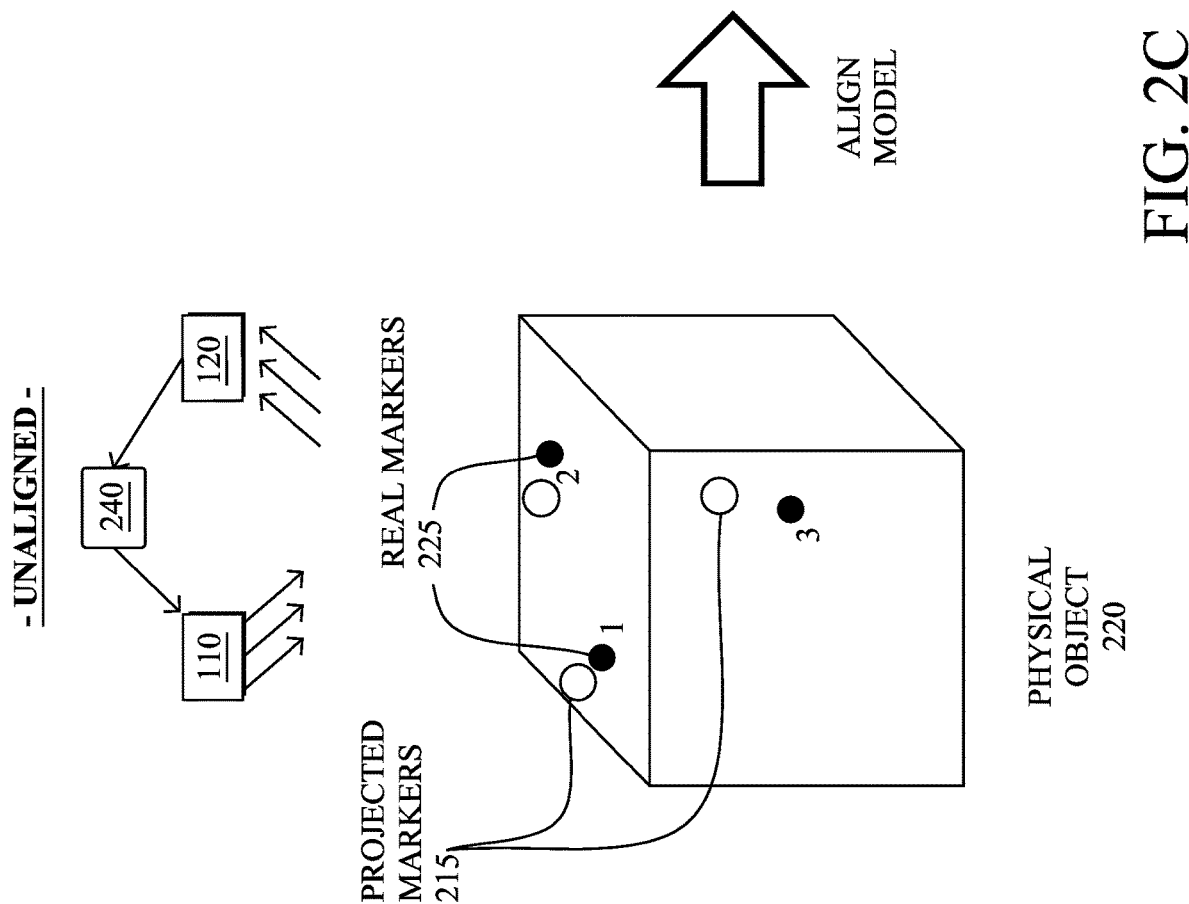

As further discussion of FIG. 2A a transitive property translation may be performed from real-life points on a real-life object to virtual points in a virtual space that can be used to orient/position/scale the object's virtual representation. First, the techniques herein project the virtual space onto the real-world space and move a virtual dot (which can be physically seen due to the projection) to cover/line-up/match the corresponding physical feature. This translates the physical position to a virtual position, and that virtual dot now represents the virtual position of that physical feature (which is used to orient/position/scale the 3D model). In other words, this process is about the translation from physical to virtual, using the projector (which overlays the virtual space onto the physical space) as a translation device. To show this, FIG. 2C illustrates virtual markers/dots 215 being supplied from an orientation program 240 into a projector 110 and projected onto the physical box 220, where sensors first determine that the projected markers do not line up with the real markers 225 (as shown in the left "unaligned" portion of FIG. 2C), and then the virtual markers may be moved to align properly (as shown in the right "aligned" portion of FIG. 2C) such that the projected virtual markers align with the real markers. Note that in certain embodiments, the software may move the virtual/projected markers, thus adjusting the virtual model to match the real world model, while in alternative or additional embodiments, the real object may be re-positioned to line up with the projected markers.

Regarding FIG. 2B, the calibration process is also about translation from physical to virtual space. However, in this step (which technically comes before FIG. 2A) attempts to create a "translation device" needed for FIG. 2A by aligning the physical and virtual spaces. That is, the techniques herein use the projector 110 to project a virtual reference point that our sensor 120 (which measures the physical space) can read and use to map (orient/scale/position) the physical space into the virtual space. Once the physical space is perfectly represented in the virtual space, physical measurements can then be translated into virtual measurements for FIG. 2A. Notably, the dots 1-6 shown (measurements) are being used to 1) find the projector's position in the virtual world and therefore 2) use the perspective projection matrix transform to align the physical/virtual spaces.

Figure 3:
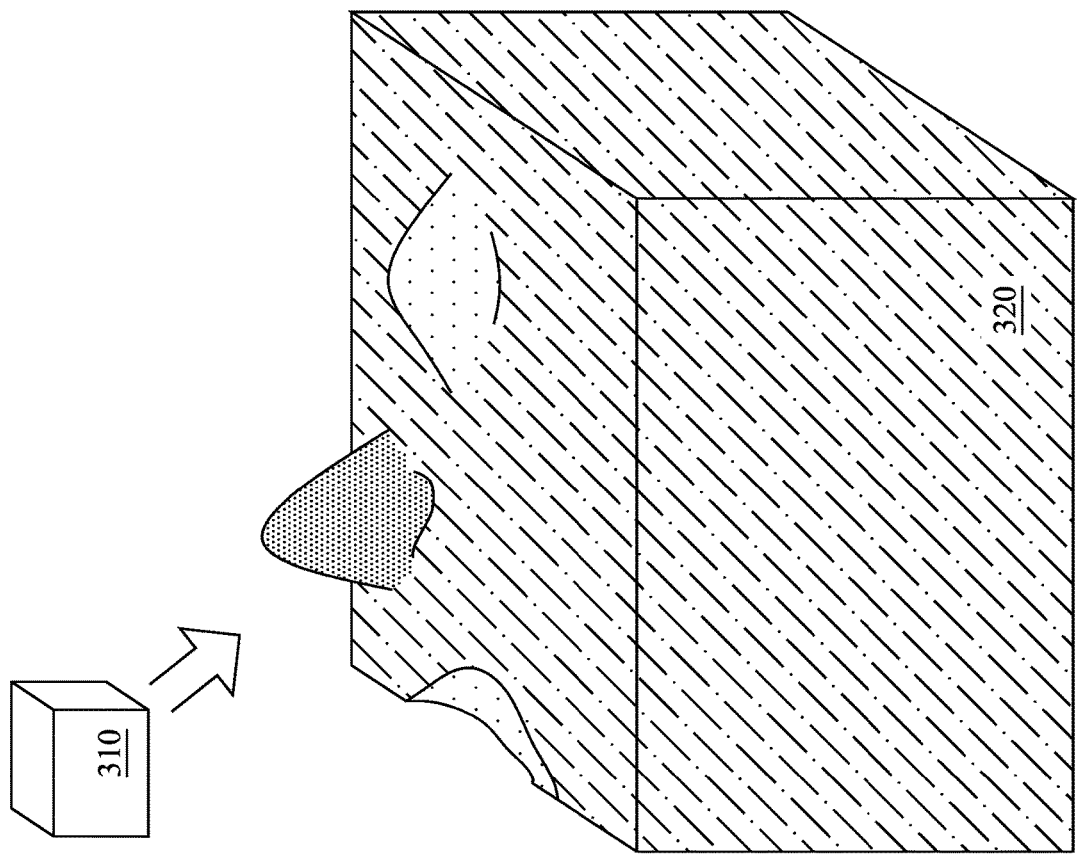
FIG. 3 illustrates an example of real-time quality control during manufacturing using augmented reality.
Figure 3:
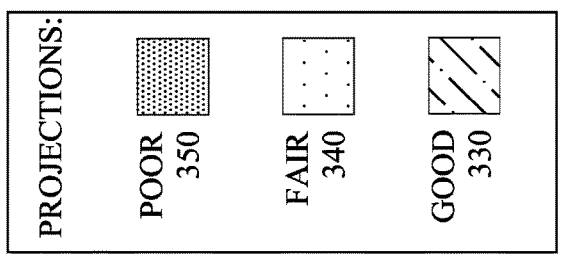

According to one or more embodiments herein, therefore, and with reference generally to FIG. 3, quality control measures may now be taken by comparing points (e.g., every measurable point) in the point cloud on physical object 320 to its matching point in the 3D virtual object (CAD) 310. If the distance is zero, a first color 330 may be projected (e.g., as green), indicating that the real-world object is correctly matching the CAD file. If the distance is less than X, a second color 340 may be projected (e.g., as yellow) to highlight that there is a small difference. If the distance is greater than X, a third color 350 may be projected (e.g., as red) to highlight a big difference. Other systems of colors and tolerances may be developed, such as under versus over tolerances (e.g., not enough or too much material), missing or extra components (e.g., missing fasteners, extra gaskets, etc.), varying degrees/ranges of tolerances (e.g., shades of colors), blinking/flashing displays, dynamic displays (e.g., indicating a part or material needs to be moved from a current location to a new location), and so on. In this manner, the techniques herein generate a real-time topographic map to highlight defects during manufacturing processes such as 3D printing, composites, and more, and optionally provides further information such as directions, context, and so on.

Advantageously, the techniques herein provide for real-time quality control during manufacturing using augmented reality. In particular, as described above, the techniques herein provide for a visually beneficial quality control system that merely requires one or more projectors, one or more sensors (e.g., IR sensors), and the appropriate control software, that in real-time projects (e.g., consistently projecting) accurate indicators of whether certain aspects of a manufactured product is correct and/or specifically within given tolerances. Notably, if the object is moved during manufacturing, the system herein can also readily recalibrate itself to match the new orientation, using the orientation techniques described above, accordingly.

While there have been shown and described illustrative embodiments, it is to be understood that various other adaptations and modifications may be made within the spirit and scope of the embodiments herein. For example, the embodiments described herein are primarily described with reference to projectors projecting actual colors on the manufactured object. However, other embodiments may project other information, such as words, instructions, images, etc. Further, while projectors are shown as projecting an image onto objects ("image projectors"), other embodiments may use glasses, head-sets, or other visual aids to illustrate the quality indicators (e.g., to the user only, and not projected on the product itself). That is, headsets, tablets, phones, and other devices may be configured as projectors herein to allow a user to overlay the digital/virtual model onto a real world object (augmented reality, virtual reality, etc.).

Moreover, the embodiments herein may generally be performed in connection with one or more computing devices (e.g., personal computers, laptops, servers, specifically configured computers, cloud-based computing devices, etc.), which may be interconnected via various local and/or network connections. Various actions described herein may be related specifically to one or more of the devices, though any reference to particular type of device herein is not meant to limit the scope of the embodiments herein.

Figure 4:
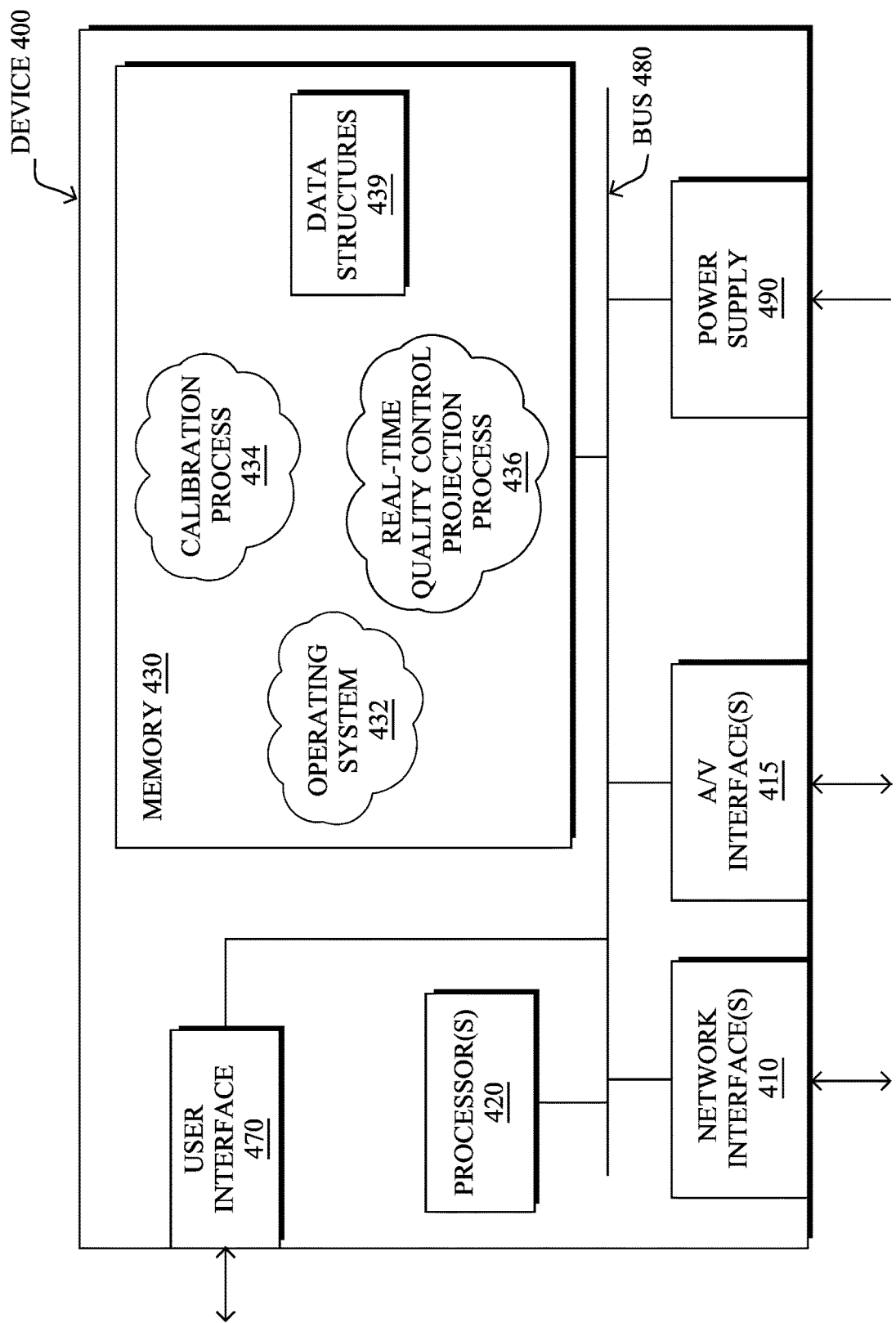
FIG. 4 is a schematic block diagram of an example computing device.

For example, FIG. 4 is a schematic block diagram of an example computing device 400 that may be used with one or more embodiments described herein. The illustrative device may comprise at least one network interface 410, one or more audio/video (A/V) interfaces 415, at least one processor 420, a memory 430, and user-interface components 470 (e.g., keyboard, monitor, mouse, etc.), interconnected by a system bus 480, as well as a power supply 490. Other components may be added to the embodiments herein, and the components listed herein are merely illustrative.

The network interface(s) 410 contain the mechanical, electrical, and signaling circuitry for communicating data over links coupled to a computer network. A/V interfaces 415 contain the mechanical, electrical, and signaling circuitry for communicating data to/from one or more A/V devices, such as cameras, IR sensors, projectors, displays, etc. The memory 430 comprises a plurality of storage locations that are addressable by the processor 420 for storing software programs and data structures associated with the embodiments described herein. The processor 420 may comprise hardware elements or hardware logic adapted to execute the software programs and manipulate the data structures 439. An operating system 432, portions of which are typically resident in memory 430 and executed by the processor, functionally organizes the machine by invoking operations in support of software processes and/or services executing on the machine. These software processes and/or services may comprise an illustrative calibration process 434 and a real-time quality control projection process 436.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Illustratively, certain aspects of the techniques described herein may be performed by hardware, software, and/or firmware, such as in accordance with the various processes and components described herein, which may contain computer executable instructions executed by the processor 420 and/or associated hardware components to perform functions relating to the techniques described herein.

Figure 5:
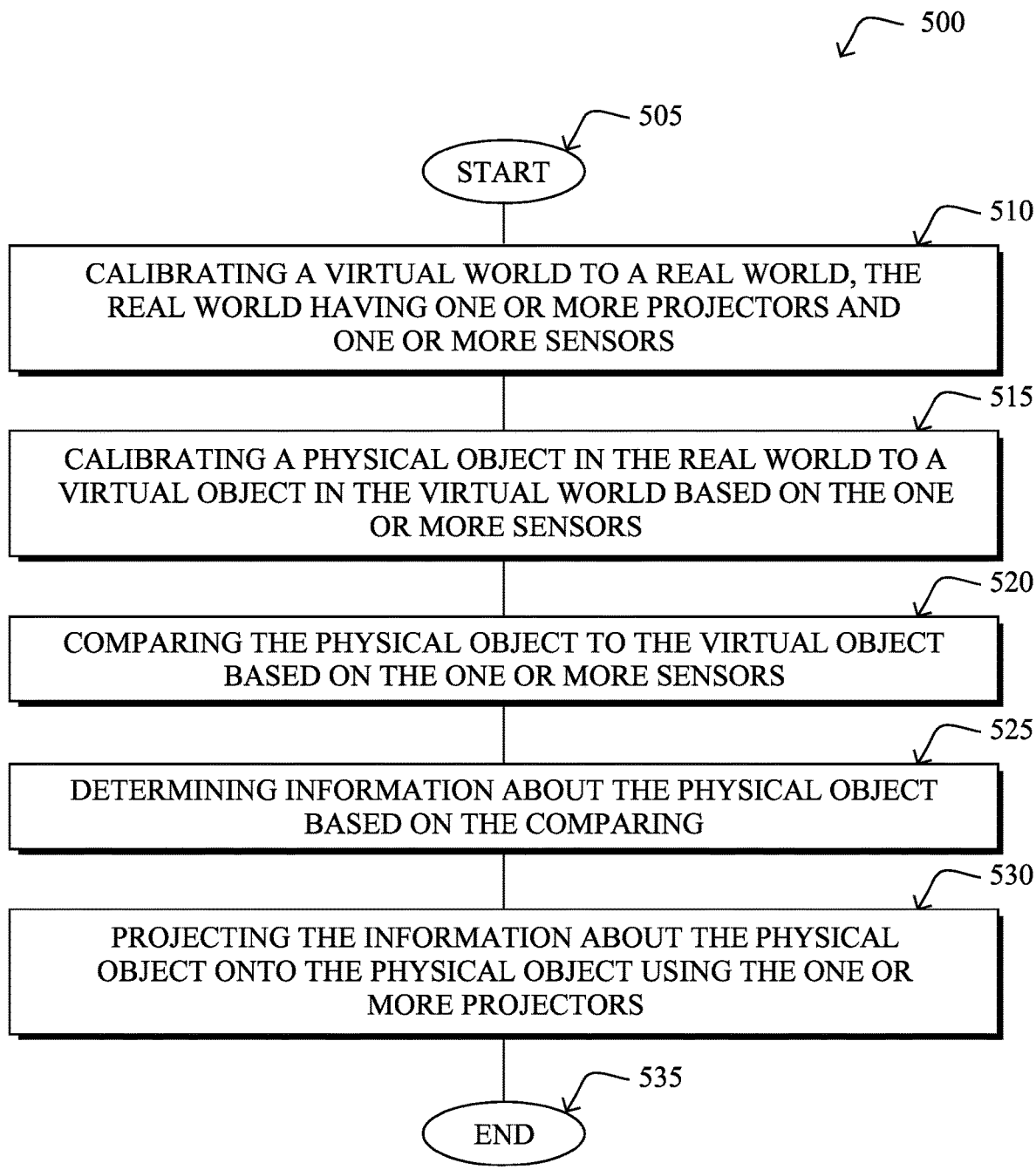
FIG. 5 illustrates an example simplified procedure for real-time quality control during manufacturing using augmented reality.

With general reference to the techniques described above, FIG. 5 illustrates an example simplified procedure for real-time quality control during manufacturing using augmented reality in accordance with one or more embodiments described herein. The procedure 500 may start at step 505, and continues to step 510, where, as described in greater detail above, the techniques herein calibrate a virtual world to a real world having one or more projectors and one or more sensors (e.g., infrared (IR) sensors, Light Distancing and Ranging (LIDAR) sensors, lasers, cameras, etc.). Note that as described above, the one or more sensors may be locked into known positions in the real world, or may be moveable in the real world (such that the method would further comprise determining a position of each of the one or more sensors in the real world, such as through inside-out tracking).

As also described above, calibrating the virtual world to the real world may comprise projecting a plurality of points (mapped within the virtual world) into the real world, sensing positions of the projected plurality of points in the real world, and correlating the sensed positions to the mapped points within the virtual world. As noted above, the one or more of the plurality of points may be projected on one or more reference objects in the real world, and may be distinguishable from each other of the plurality of points.

In step 515, the techniques herein also calibrate a physical object in the real world to a virtual object in the virtual world based on the one or more sensors. As noted, such calibration may be based on performing an orientation technique to determine orientation, scale, and position of the physical object in relation to the virtual object according to the one or more sensors.

In step 520, the techniques herein may then compare the physical object to the virtual object based on the one or more sensors, in order to determine, in step 525, information about the physical object based on the comparing. For example, the information may comprise design information (what an object is supposed to look like), manufacturing instruction indications (e.g., next steps, locations of parts, etc.), or quality control information. With regard to determining the quality control information, this may be performed as described above according to a difference between the virtual object and the physical object based on the comparing.

In step 530, the techniques herein may then project the information about the physical object onto the physical object using the one or more projectors. For example, quality control information may comprise a color-coded indication of quality, an indication of one or both of either too little or too much material, and so on. Words, images, movement, animation, etc., may also be projected, for quality control, design, manufacturing instructions, and so on.

The simplified procedure 500 ends in step 535, notably with the option to continue to detect defects/differences, re-orient the object (e.g., detecting that the physical object has moved within the real world, and re-calibrating the physical object in the real world to the virtual object in the virtual world based on the one or more sensors), and so on.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   calibrating, by a process, a virtual world to a real world, the real world having one or more projectors and one or more sensors;
   calibrating, by the process, a physical object in the real world to a virtual object in the virtual world based on the one or more sensors;
   comparing, by the process, the physical object to the virtual object based on the one or more sensors;
   determining, by the process, information about the physical object based on the comparing, wherein the information about the physical object comprises quality control information including an indication of one or both of either too little or too much material; and
   projecting, by the process, the information about the physical object onto the physical object using the one or more projectors.

2. The method as in claim 1, wherein the information about the physical object further comprises design information.

3. The method as in claim 1, wherein the information about the physical object further comprises manufacturing instruction indications.

4. The method as in claim 1, wherein the one or more sensors are selected from a group consisting of: infrared (IR) sensors; Light Distancing and Ranging (LIDAR) sensors; lasers; and cameras.

5. The method as in claim 1, wherein the one or more sensors are locked into known positions in the real world.

6. The method as in claim 1, wherein the one or more sensors are moveable in the real world, the method further comprising:
   determining a position of each of the one or more sensors in the real world.

7. The method as in claim 6, wherein determining the position comprises inside-out tracking.

8. The method as in claim 1, wherein calibrating the virtual world to the real world comprises:
   projecting a plurality of points, mapped within the virtual world, into the real world sensing positions of the projected plurality of points in the real world; and
   correlating the sensed positions to the mapped points within the virtual world.

9. The method as in claim 8, wherein one or more of the plurality of points are projected on one or more reference objects in the real world.

10. The method as in claim 8, wherein one or more of the plurality of points are distinguishable from each other of the plurality of points.

11. The method as in claim 1, wherein calibrating the physical object in the real world to the virtual object in the virtual world comprises:

performing an orientation technique to determine orientation, scale, and position of the physical object in relation to the virtual object according to the one or more sensors.

12. The method as in claim 1, further comprising:
detecting that the physical object has moved within the real world; and
re-calibrating the physical object in the real world to the virtual object in the virtual world based on the one or more sensors.

13. The method as in claim 1, wherein the one or more projectors are selected from a group consisting of: image projectors; headsets; tablets; phones; and smart glasses.

14. A method, comprising:
calibrating, by a process, a virtual world to a real world, the real world having one or more projectors and one or more sensors;
calibrating, by the process, a physical object in the real world to a virtual object in the virtual world based on the one or more sensors;
comparing, by the process, the physical object to the virtual object based on the one or more sensors;
determining, by the process, information about the physical object based on the comparing; and
projecting, by the process, the information about the physical object onto the physical object using the one or more projectors,
wherein the one or more sensors are selected from a group consisting of: infrared (IR) sensors; Light Distancing and Ranging (LIDAR) sensors; lasers; and cameras.

15. A method, comprising:
calibrating, by a process, a virtual world to a real world, the real world having one or more projectors and one or more sensors;
calibrating, by the process, a physical object in the real world to a virtual object in the virtual world based on the one or more sensors;
comparing, by the process, the physical object to the virtual object based on the one or more sensors;
determining, by the process, information about the physical object based on the comparing; and
projecting, by the process, the information about the physical object onto the physical object using the one or more projectors,
wherein the one or more sensors are locked into known positions in the real world.

16. A method, comprising:
calibrating, by a process, a virtual world to a real world, the real world having one or more projectors and one or more sensors;
calibrating, by the process, a physical object in the real world to a virtual object in the virtual world based on the one or more sensors;
comparing, by the process, the physical object to the virtual object based on the one or more sensors;
determining, by the process, information about the physical object based on the comparing; and
projecting, by the process, the information about the physical object onto the physical object using the one or more projectors,
wherein the one or more sensors are moveable in the real world, the method further comprising determining a position of each of the one or more sensors in the real world.

17. A method, comprising:
calibrating, by a process, a virtual world to a real world, the real world having one or more projectors and one or more sensors;
calibrating, by the process, a physical object in the real world to a virtual object in the virtual world based on the one or more sensors;
comparing, by the process, the physical object to the virtual object based on the one or more sensors;
determining, by the process, information about the physical object based on the comparing; and
projecting, by the process, the information about the physical object onto the physical object using the one or more projectors,
wherein calibrating the virtual world to the real world comprises:
projecting a plurality of points, mapped within the virtual world, into the real world sensing positions of the projected plurality of points in the real world; and
correlating the sensed positions to the mapped points within the virtual world.

18. A method, comprising:
calibrating, by a process, a virtual world to a real world, the real world having one or more projectors and one or more sensors;
calibrating, by the process, a physical object in the real world to a virtual object in the virtual world based on the one or more sensors;
comparing, by the process, the physical object to the virtual object based on the one or more sensors;
determining, by the process, information about the physical object based on the comparing; and
projecting, by the process, the information about the physical object onto the physical object using the one or more projectors,
wherein calibrating the physical object in the real world to the virtual object in the virtual world comprises performing an orientation technique to determine orientation, scale, and position of the physical object in relation to the virtual object according to the one or more sensors.

19. A method, comprising:
calibrating, by a process, a virtual world to a real world, the real world having one or more projectors and one or more sensors;
calibrating, by the process, a physical object in the real world to a virtual object in the virtual world based on the one or more sensors;
comparing, by the process, the physical object to the virtual object based on the one or more sensors;
determining, by the process, information about the physical object based on the comparing;
projecting, by the process, the information about the physical object onto the physical object using the one or more projectors;
detecting that the physical object has moved within the real world; and
re-calibrating the physical object in the real world to the virtual object in the virtual world based on the one or more sensors.

20. A method, comprising:
calibrating, by a process, a virtual world to a real world, the real world having one or more projectors and one or more sensors;
calibrating, by the process, a physical object in the real world to a virtual object in the virtual world based on the one or more sensors;

comparing, by the process, the physical object to the virtual object based on the one or more sensors;

determining, by the process, information about the physical object based on the comparing; and projecting, by the process, the information about the physical object onto the physical object using the one or more projectors, wherein the one or more projectors are selected from a group consisting of: image projectors; headsets; tablets; phones; and smart glasses.

* * * * *